(12) United States Patent
Roh

(10) Patent No.: US 7,463,319 B2
(45) Date of Patent: Dec. 9, 2008

(54) FOUR-COLOR LIQUID CRYSTAL DISPLAY WITH VARIOUS REFLECTIVE AND TRANSMISSIVE AREAS

(75) Inventor: Nam-Seok Roh, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 527 days.

(21) Appl. No.: 11/229,496

(22) Filed: Sep. 20, 2005

(65) Prior Publication Data

US 2006/0187386 A1 Aug. 24, 2006

(30) Foreign Application Priority Data

Feb. 24, 2005 (KR) ..................... 10-2005-0015462

(51) Int. Cl.
*G02F 1/1335* (2006.01)
(52) U.S. Cl. ................... 349/114; 349/106; 349/109
(58) Field of Classification Search ......... 349/106–109, 349/114
See application file for complete search history.

(56) References Cited

U.S. PATENT DOCUMENTS

| | | | | |
|---|---|---|---|---|
| 6,850,294 B2* | 2/2005 | Roh et al. | | 349/106 |
| 6,888,604 B2* | 5/2005 | Rho et al. | | 349/146 |
| 6,909,479 B2* | 6/2005 | Iijima | | 349/109 |
| 7,215,392 B2* | 5/2007 | Nakano et al. | | 349/106 |
| 7,339,642 B2* | 3/2008 | Iijima et al. | | 349/114 |
| 2003/0117423 A1 | 6/2003 | Brown Elliott et al. | | |
| 2004/0095521 A1 | 5/2004 | Song et al. | | |
| 2004/0125285 A1 | 7/2004 | Arai et al. | | |
| 2004/0135937 A1 | 7/2004 | Lee et al. | | |

FOREIGN PATENT DOCUMENTS

| | | |
|---|---|---|
| JP | 08211223 | 8/1996 |
| JP | 09189902 | 7/1997 |
| JP | 2003241165 | 8/2003 |
| JP | 2004004822 | 1/2004 |
| JP | 2004102292 | 4/2004 |
| JP | 2004258527 | 9/2004 |
| KR | 1020040043865 | 5/2004 |
| KR | 1020040061672 | 7/2004 |
| KR | 1020040070542 | 8/2004 |
| KR | 1020040080778 | 9/2004 |
| KR | 1020040085678 | 10/2004 |

OTHER PUBLICATIONS

"9.2: Implementation of RGBW Color System in TFT-LCDs"; Authors: Baek-woon Lee, et al.; SID International Symposium; pp. 111-113 (2004).
European Search Report for Application No. 06110041.8-2205; Dated: Jul. 13, 2006.

* cited by examiner

*Primary Examiner*—Andrew Schechter
(74) *Attorney, Agent, or Firm*—Cantor & Colburn LLP

(57) ABSTRACT

This invention relates generally to a four-color liquid crystal display, and more particularly, to a structure of a pixel of a transreflective liquid crystal display adopting a rendering method and four-color technology. The four-color LCD includes a plurality of pixels, each pixel including a set of six subpixels arranged in a 2×3 matrix. Each subpixel has a transmissive area and a reflective area. A first subpixel, included in the set of six subpixels, has a reflective area equal to or larger than the transmissive area, while each of the remaining subpixels has a transmissive area larger than the reflective area. The four-color LCD adopting the rendering technology realizes full-color display without a yellowish phenomenon.

28 Claims, 8 Drawing Sheets

FIG.3
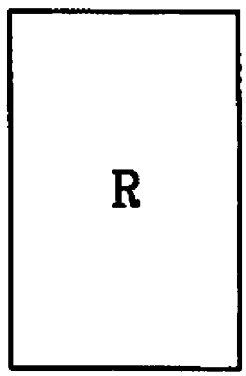
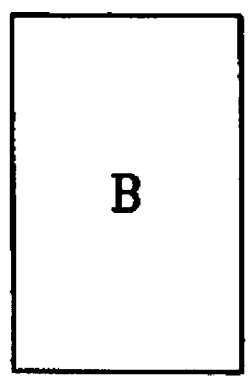
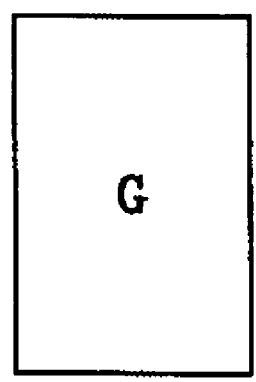
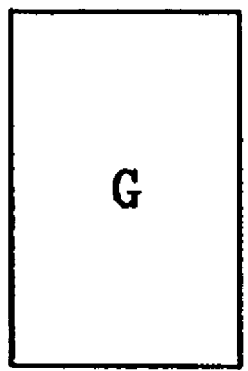
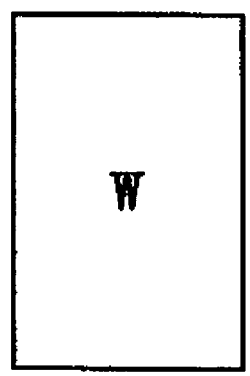
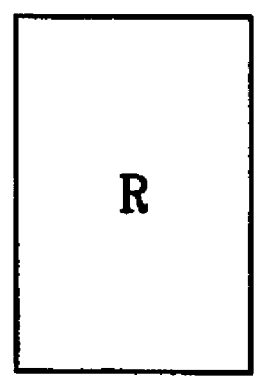

FOUR-COLOR LIQUID CRYSTAL DISPLAY WITH VARIOUS REFLECTIVE AND TRANSMISSIVE AREAS

CROSS REFERENCE TO RELATED APPLICATION

This application claims priority to and the benefit of Korean Patent Application No. 10-2005-0015462, filed on Feb. 24, 2005, which is hereby incorporated by reference for all purposes as if fully set forth herein.

BACKGROUND OF THE INVENTION

1. Field of the Invention

The present invention generally relates to a four-color liquid crystal display, and more particularly, to a structure of a pixel of transreflective liquid crystal display adopting a rendering method and a four-color technology.

2. Description of the Related Art

Liquid crystal displays (LCDs) are among the most widely used flat panel display devices. Generally, an LCD includes a pair of panels each having an electrode on an inner surface, and a dielectric anisotropic liquid crystal layer interposed between the panels. In the LCD, the variation of the voltage difference between the field generating electrodes, e.g., the variation in the strength of an electric field generated by the electrodes, changes the transmittance of the light passing through the LCD, and thus desired images are obtained by controlling the voltage difference between the electrodes.

Depending on a type of light source used for image display, an LCD may be classified as three types: a transmissive LCD, a reflective LCD, and a transreflective LCD. The transmissive LCD includes pixels that are illuminated from a back side using a backlight. The reflective LCD includes pixels that are illuminated from a front side using incident light of the ambient environment. The transreflective LCD combines the transmissive and the reflective characteristics. Under medium light conditions such as an indoor environment or under complete darkness conditions, transreflective LCDs operate in the transmissive mode, while under bright conditions such as in an outdoor environment, transreflective LCDs operate in the reflective mode.

A four-color subpixel technology, in which a white subpixel is added to a set of red, green, and blue subpixels, has been developed to improve the brightness of LCD panels.

The four-color technology controls a resolution of an LCD by a rendering method. In the subpixel rendering method, red, green, blue, and white subpixels are individually controlled. When a specific subpixel operates, the subpixels adjacent thereto operate along with the specific pixel, so that a pixel is represented as the brightness divided by the specific pixel and the adjacent operating subpixels. With this method, more specific expressions of slant lines or curved lines become possible, improving the resolution.

In the LCDs adopting such a subpixel rendering technology, a set of six subpixels, rather than a set of four subpixels form one pixel. In this structure, red, green, blue, and white subpixels are arranged substantially in a matrix. For example, red-blue-green subpixels may be arranged in an upper horizontal line and green-white-red subpixels may be arranged in a lower horizontal line.

Conventionally, the four-color rendering technology has only been applicable to the reflective LCDs, no transmissive LCD currently uses this technology.

When applying the rendering technology to the existing transflective LCDs having reflective areas and transmissive areas, chromaticity coordinates of white are transferred, generating a yellowish phenomenon.

In conventional LCDs, the ratio of a transmissive area and a reflective area assigned in each subpixel is approximately 2:1, and the brightness ratio of the transmissive areas or the reflective areas for the red, green, blue, and white subpixels is 2:2:1:1. The yellowish phenomenon is caused by an insufficient blue component. To compensate for such a component, a method compensating the blue component of lamps that supply light to the LCD may be used. However, this method is applicable to the transmissive mode, and is not applicable to the reflective mode because the reflective mode utilizes natural light.

SUMMARY OF THE INVENTION

The present invention provides an LCD that adopts a four-color rendering technology with diminished yellowish phenomenon.

Additional features of the invention will be set forth in the description which follows, and in part will be apparent from the description, or may be learned by practice of the invention.

The present invention discloses a four-color liquid crystal display including a plurality of pixels, each pixel comprising a set of six subpixels, wherein each subpixel includes a transmissive area and a reflective area, wherein the reflective area is equal to or larger than the transmissive area in a first subpixel, and wherein the transmissive area is larger than the reflective area in each of the remaining subpixels.

The present invention also discloses a four-color liquid crystal display, including a plurality of pixels, wherein each pixel includes a set of six subpixels comprising a red color, a green color, a blue color, and a white color. The subpixels are arranged in a 2×3 matrix and each of the subpixels include a transmissive area and a reflective area. A blue subpixel's reflective area is larger than or about the same as it's transmissive area. On the other hand, the transmissive area of each of the red, the green, and the white subpixels is larger than each of it's reflective area.

It is to be understood that both the foregoing general description and the following detailed description are only exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 3 shows spatial arrangement of subpixels of an LCD according to an embodiment of the invention.

DESCRIPTION OF THE ILLUSTRATED EMBODIMENTS

Figure 1:
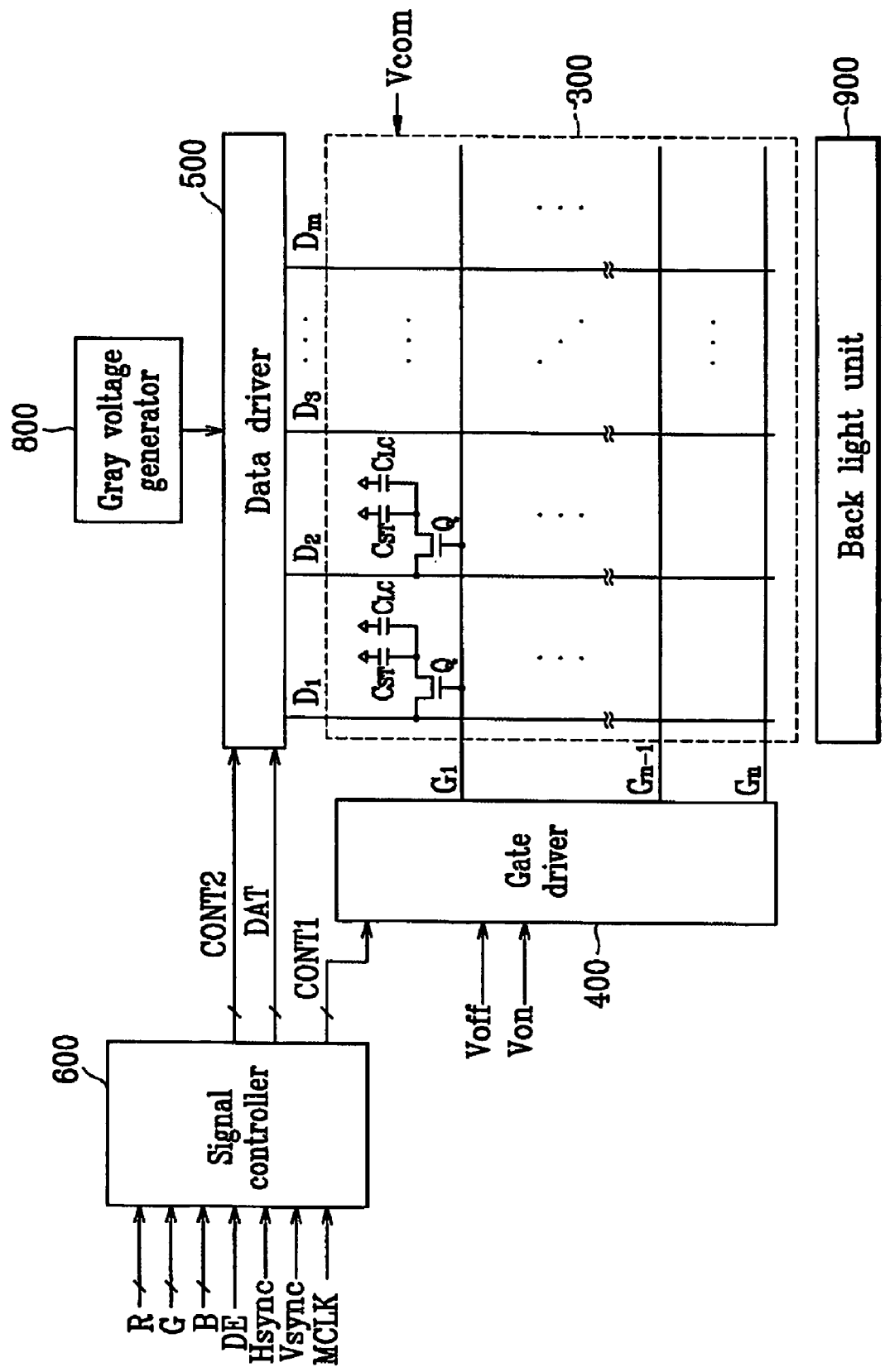
FIG. 1 is a block diagram of an LCD according to an embodiment of the invention.

Embodiments of the present invention will now be described more fully below with reference to the accompanying drawings, in which preferred embodiments of the invention are shown. The present invention may, however, be embodied in different forms and should not be construed as being limited to the embodiments set forth herein. Rather, these embodiments are provided so that this disclosure will be complete, and fully convey the scope of the invention to those skilled in the art.

In the drawings, the thickness of the layers, films, and regions are exaggerated for clarity. Like numerals refer to like elements throughout. It will be understood that when an element such as a layer, film, region, or substrate is referred to as being "on" another element, the element may be directly on the other element or an intervening element may be present.

Hereinafter, LCDs according to an embodiment of the invention are described with reference to the accompanying drawings.

Figure 2:
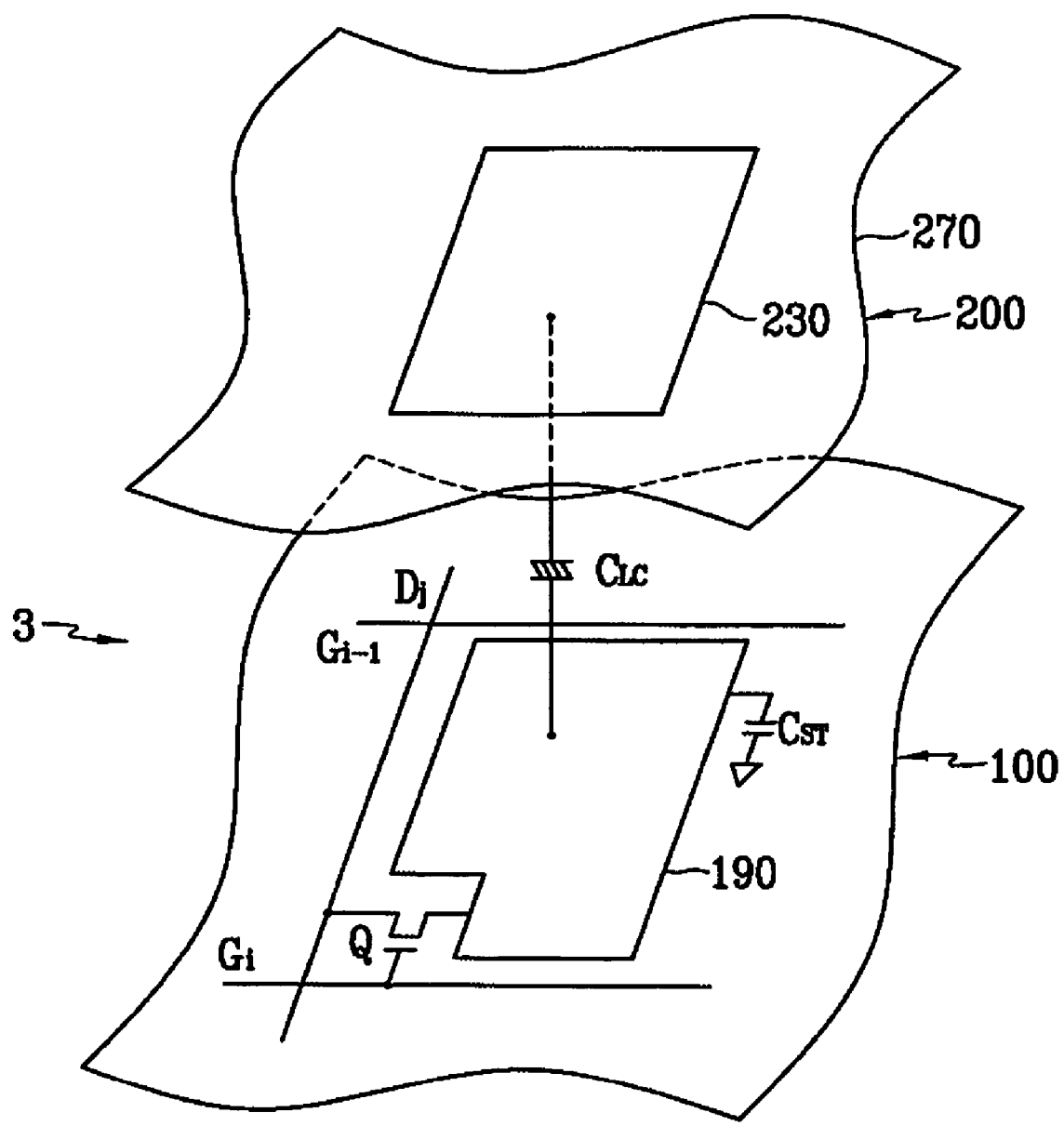
FIG. 2 is an equivalent circuit view of a subpixel of an LCD according to an embodiment of the invention.

FIG. 1 is a block diagram of an LCD according to an embodiment of the invention. FIG. 2 is an equivalent circuit view of a subpixel of an LCD according to an embodiment of the invention. FIG. 3 shows a spatial arrangement of six subpixels employed in an LCD according to an embodiment of the invention.

Referring to FIG. 1, an LCD includes an LC panel assembly 300, a gate driver 400 and a data driver 500 that are connected or coupled with the LC panel assembly 300, a gray voltage generator 800 connected with the data driver 400, a backlight unit 900 for supplying light to the LC panel assembly 300, and a signal controller 600 for controlling the above elements.

Referring to FIG. 2, the LC panel assembly 300 includes a plurality of display signal lines $G_l$-$G_n$ and $D_l$-$D_m$, and a plurality of subpixels connected thereto and arranged substantially in a matrix.

The display signal lines include a plurality of gate lines $G_l$-$G_n$ for transmitting gate signals (also referred to as "scanning signals"), and a plurality of data lines $D_l$-$D_m$ for transmitting data signals. The gate lines $G_l$-$G_n$ extend substantially in a row direction and are substantially parallel to each other, while the data lines $D_l$-$D_m$ extend substantially in a column direction and are substantially parallel to each other.

Each subpixel includes a switching element Q that is connected with the display signal lines $G_l$-$G_n$ and $D_l$-$D_m$, and an LC capacitor $C_{LC}$ and a storage capacitor $C_{ST}$ that are connected with the switching element Q. The storage capacitor $C_{ST}$ may be omitted as necessary.

The switching element Q is provided on the lower panel 100 and includes three terminals: a control terminal connected with one of the gate lines $G_l$-$G_n$; an input terminal connected with one of the data lines $D_l$-$D_m$; an output terminal connected with both the LC capacitor $C_{LC}$ and the storage capacitor $C_{ST}$. The switching element Q may be a thin film transistor (TFT) and may include amorphous silicon.

The LC capacitor $C_{LC}$ includes a pixel electrode 190, provided on the lower panel 100, and a common electrode 270, provided on the upper panel 200, as two terminals. The LC layer 3 interposed between the two electrodes 190 and 270 operates as a dielectric of the LC capacitor $C_{LC}$. The pixel electrode 190 is connected with the switching element Q, and the common electrode 270 is supplied with a common voltage $V_{com}$, and covers the entire surface of the upper panel 200. Alternatively, the common electrode 270 may be provided on the lower panel 100. One embodiment of the invention has pixel electrode 190 and common electrode 270 shaped substantially like a bar or a stripe.

When the pixel electrode 190 and a separate signal line (not shown), which is provided on the lower panel 100, cross each other, the overlap portion becomes the storage capacitor $C_{ST}$. The separate signal line is supplied with a predetermined voltage such as the common voltage $V_{com}$. Alternately, the storage capacitor $C_{ST}$ may be formed by crossing or overlapping of the pixel electrode 190 and a previous gate line that is placed directly before the pixel electrode 190, interposing an insulator therebetween.

The backlight unit 900 may include an inverter (not shown) and a light source (not shown). The light source may be mounted or attached under the LC panel assembly 300 with at least one lamp. A cold cathode fluorescent lamp (CCFLs), an external electrode fluorescent lamp (EEFLs) or a light emitting diodes (LEDs) may be used as the lamp.

In a color display, each subpixel must exhibit one color. This requirement is implemented using four-color (red, green, blue, and white) color filters 230, each provided at regions of the upper panel 200 facing the pixel electrodes 190.

Referring to FIG. 2, the color filters 230 are formed at corresponding regions of the upper panel 200. Alternately, the color filters may be formed on or under the pixel electrodes 190 of the lower panel 100.

Hereinafter, each subpixel is referred to as one among red, green, blue, and white subpixels depending on the exhibiting color. The red, green, blue, and white subpixels are denoted by reference characters R, G, B, and W, respectively, similar to the image signals.

FIG. 3 shows a spatial arrangement of six subpixels, wherein a blue subpixel B and a white subpixel W are arranged along a central vertical line. Two green subpixels G are arranged in a diagonal line (/) and two red subpixels R are arranged in an opposite diagonal line (\), centering the blue and white subpixels. These six subpixels form one pixel. The pixel may be formed having two rows of these subpixels, e.g., R, B, and G subpixels forming a top row and G, W, and R subpixels forming a bottom row.

A polarizer (not shown) may be provided on either outer surface of the two panels 100 and 200 for polarizing light coming from the light source.

The gray voltage generator 800 generates two sets of a plurality of gray voltages related to the transmittance of the pixels. The gray voltages in one set have a positive polarity with respect to the common voltage $v_{com}$, while the gray voltages of the other set have a negative polarity with respect to the common voltage $v_{com}$.

The gate drivers 400 are connected with each of the gate lines $G_l$-$G_n$ of the LC panel assembly 300 individually for transmitting the gate signals consisting of combinations of the gate-on voltage $V_{on}$ and the gate-off voltage $V_{off}$ input from an external device to the gate signal lines $G_l$-$G_n$. The gate drivers 400 operate as shift registers with a plurality of stages arranged substantially in a line.

The data drivers 500 are connected with the data lines $D_l$-$D_m$ of the LC panel assembly 300 for transmitting the data voltages, which are selected from the gray voltages supplied from the gray voltage generator 800, to the subpixels. The data drivers 500 may be formed of IC chips.

The signal controller 600 controls the operation of the gate drivers 400 or the data drivers 500.

The operation of the above-mentioned LCD is described below in more detail.

The signal controller 600 receives input image signals R, G, and B and input control signals for controlling the display thereof. The input control signals may include a vertical synchronizing signal $V_{sync}$, a horizontal synchronizing signal $H_{sync}$, a main clock MCLK, a data enable signal DE, etc., received from an external graphic controller (not shown). In response to the input control signals, the signal controller 600 generates gate control signals CONT1 and data control signals CONT2, and processes image signals R, G, and B to four colors image signals DAT suitable for the operation of the LC panel assembly 300. The signal controller 600 outputs the gate control signals CONT1 to the gate driver 400 while outputting the data control signals CONT2 and the processed image signals DAT to the data driver 500. The processed image signals DAT may include white signals, which are extracted from the image signal R, G, and B, and the rendering processed image signals R, G, and B.

The gate control signals CONT1 include a vertical synchronizing start signal STV for informing the start of output of a gate-on voltage $V_{on}$, a gate clock signal CPV for controlling the output time of the gate-on voltage $V_{on}$, and an output enable signal OE for defining the duration of the gate-on voltage $V_{on}$.

The data control signals CONT2 include a horizontal synchronizing start signal STH for informing the beginning of input of the image signals DAT, a load signal LOAD for instructing to apply the relative data voltages to the data lines $D_1$-$D_m$, a reverse signal RVS for reversing the polarity of the data voltages with respect to the common voltage $V_{com}$, and a data clock signal HCLK.

Responsive to the data control signals CONT2 from the signal controller 600, the data driver 500 successively receives the image data DAT for a row of the pixels from the signal controller 600, converts the image data DAT into analog data voltages selected from the gray voltages supplied from the gray voltage generator 800, and applies the data voltages to data lines $D_1$-$D_m$.

The gate driver 400 applies the gate-on voltage Von to the gate lines $G_1$-$G_n$ in response to the gate control signals CONT1 from the signal controller 600, thereby turning on the switching elements Q connected thereto. The data voltages applied to the data lines $G_1$-$G_n$ may be transmitted to the corresponding subpixels through the activated switching elements Q.

The difference between the data voltage applied to the subpixel and the common voltage $V_{com}$ is referred to as a voltage across the LC capacitor $C_{LC}$, e.g., a pixel voltage. The orientations of LC molecules in the LC layer 3 change depending on the magnitude of the pixel voltage. The orientations of the LC molecules determine the polarization of light passing through the LC layer 3. The polarizers (not shown), which may be attached with the outer surfaces of the two panels 100 and 200, convert the light polarization into the light transmittance.

By repeating this procedure by an integer that is a multiple of a unit of the horizontal period (which is denoted by "1H" and is equal to one period of the horizontal synchronizing signal $H_{sync}$, the data enable signal DE, and the gate clock CPV), all gate lines $G_1$-$G_n$ are sequentially supplied with the gate-on voltage $V_{on}$ during a frame, thereby applying the data voltages to all pixels. When the next frame starts after finishing one frame, the reverse control signal RVS applied to the data driver 500 is controlled such that the polarity of the data voltages is reversed with respect to that of the previous frame (which is referred to as "frame inversion"). The reverse control signal RVS may also be controlled such that the polarity of the data voltages flowing along a data line in one frame is reversed (for example, line inversion and dot inversion), or the polarity of the data voltages in one packet is reversed (for example, column inversion and dot inversion).

The structure of the LCD according to an embodiment of the invention is described below with reference to FIG. 4, FIG. 5, and FIG. 6.

Figure 4:
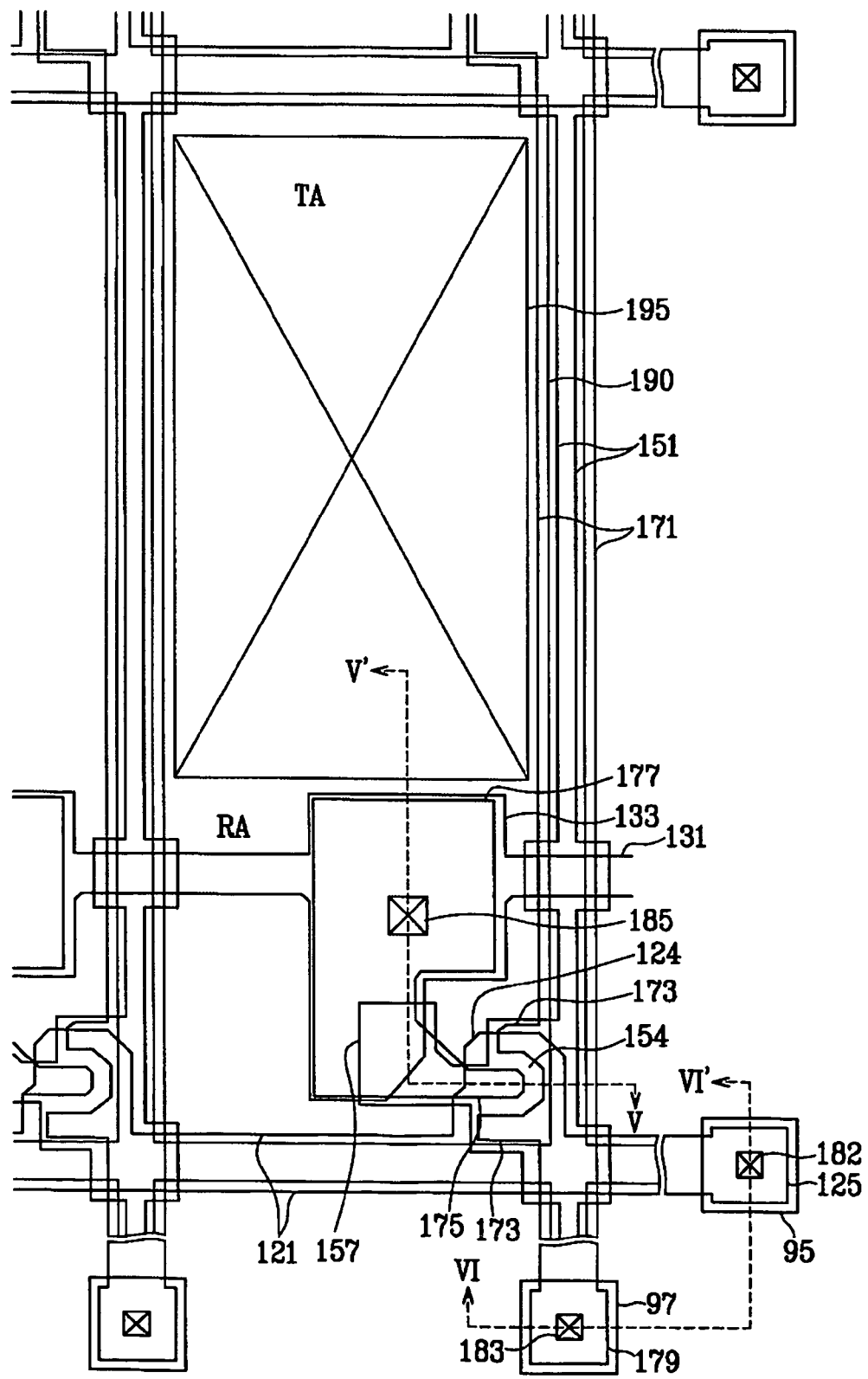
FIG. 4 is a layout view of an LCD according to an embodiment of the invention.

FIG. 4 is a layout view of an LCD according to an embodiment of the invention. FIG. 5 and FIG. 6 are cross-sectional views cut along V-V' and VI-VI' of FIG. 4, respectively.

The LCD includes a TFT panel 100 and a common electrode panel 200 facing each other, and an LC layer 3 interposed therebetween. The LC layer 3 includes LC molecules aligned vertically or horizontally with respect to the surfaces of the two panels 100 and 200.

The LC layer 3 may include 900 twisted nematic (TN) mode LC molecules, vertical alignment (VA) mode LC molecules, or electrically controlled birefringence (ECB) mode LC molecules.

Polarizers 12 and 22 are provided on the outer surfaces of the two panels 100 and 200. The transmission axis (θ) of the polarizer 22 is substantially perpendicularly crossed with the transmission axis (θ+90°) of the polarizer 12.

TFT panel 100 as a lower panel of an LCD panel assembly 300 may be configured in the manner described below.

Figure 5:
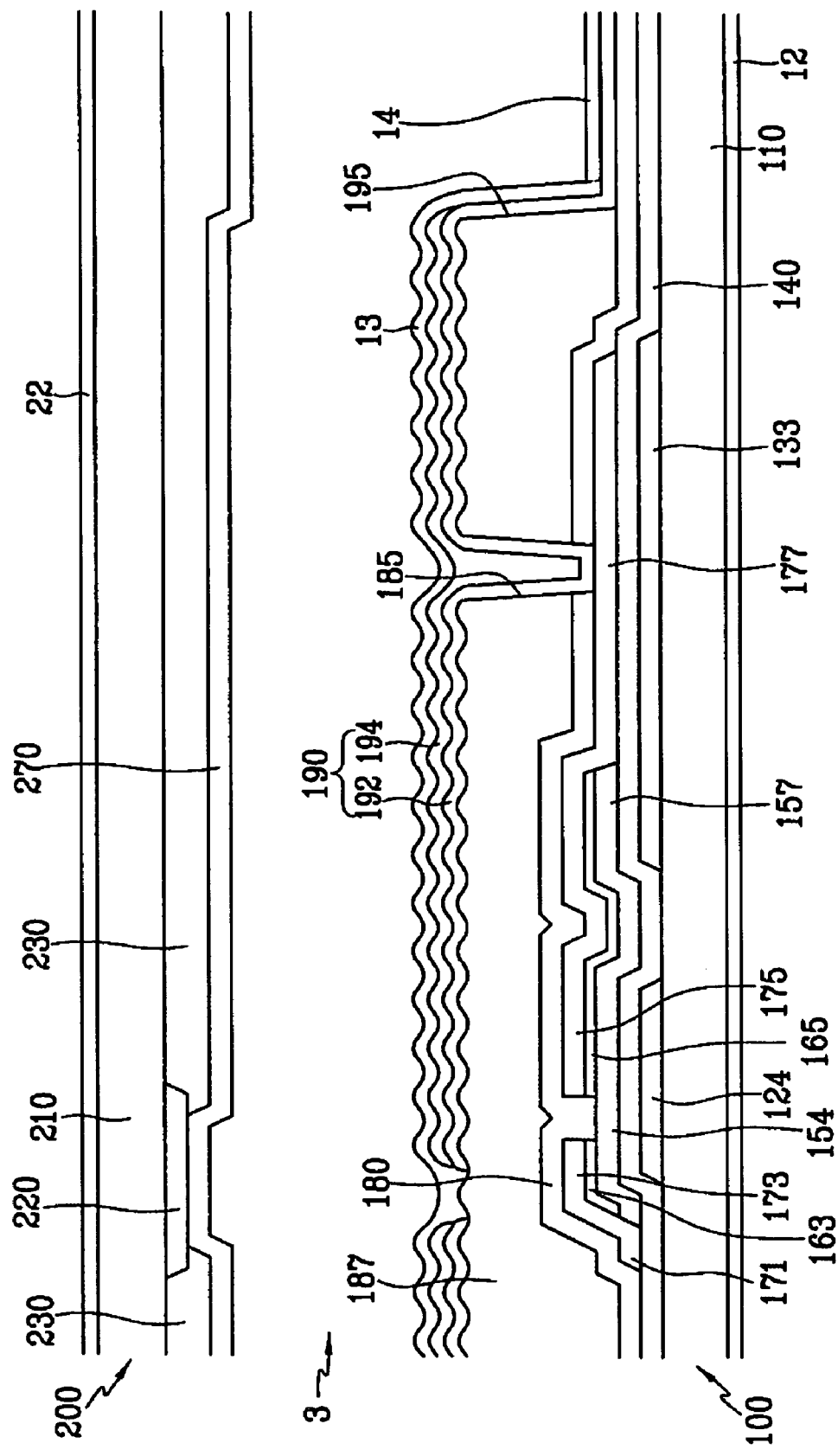
FIG. 5 is a cross-sectional view cut along V-V' of FIG. 4.
Figure 6:
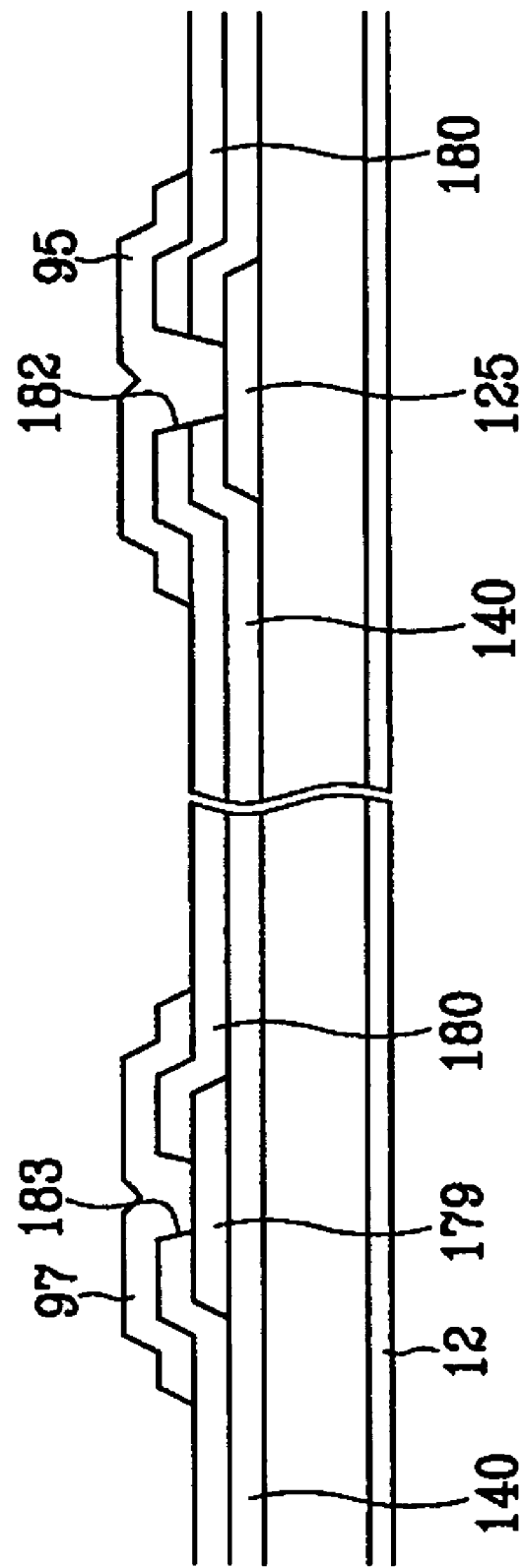
FIG. 6 is a cross-sectional view cut along VI-VI' of FIG. 4.

As shown in FIG. 4, FIG. 5, and FIG. 6, a plurality of gate lines 121 and a plurality of storage electrode lines 131 are formed on an insulating substrate 110 made of a transparent material, such as glass.

The gate lines 121 extend substantially in a horizontal direction, while being separated from each other, and transmit gate signals. Each gate line 121 includes a plurality of gate electrodes 124 protruding or extending upward and an end portion 125 that is sufficiently large to connect with an external device.

The storage electrode lines 131 extend substantially in a horizontal direction and include a plurality of protrusions. The protrusions form storage electrodes 133. The storage electrode lines 131 receive a predetermined voltage such as a common voltage from a common electrode 270 of the common electrode panel 200.

The gate lines 121 and the storage electrode lines 131 may be made of an aluminum (Al) containing metal such as Al and an Al alloy, a silver (Ag) containing metal such as Ag and an Ag alloy, a copper (Cu) containing metal such as Cu and a Cu alloy, a molybdenum (Mo) containing metal such as Mo and an Mo alloy, chrome (Cr), titanium (Ti), or tantalum (Ta).

The gate lines 121 and the storage electrode lines 131 may have a multi-layered structure, in which two layers (not shown) having different physical properties are included. In such a structure, upper layers may be made of a low resistivity metal, for example an Al containing metal such as Ag and an Ag alloy, to reduce delay of the signals or voltage drop in the gate lines 121 and the storage electrode lines 131. The lower layers may be made of a material having prominent contact properties with other materials such as indium tin oxide (ITO), indium zinc oxide (IZO), etc. For example, the lower layer may be formed with Mo, Mo alloys, Cr, Ta, Ti,. Accordingly, the multi-layered structure may include a lower Cr layer and an upper Al—Nd layer.

The gate lines 121 and the storage electrode lines 131 may have the single-layered structure, double-layered structure, or a multi-layered structure including three or more layers.

All lateral sides of the gate lines 121 and the storage electrode lines 131 slope in the range from about 30° to about 80° to the surface of the substrate 110.

A gate insulating layer 140 made of nitride silicon (SiNx), etc., is formed on the gate lines 121.

A plurality of linear semiconductors 151 made of hydrogenated amorphous silicon, abbreviated as "a-Si", or polysilicon, are formed on the gate insulating layer 140. Each linear semiconductor 151 extends substantially in a vertical direction, and includes a plurality of projections 154, each projection 154 extending along the gate electrode 124, and a plurality of extensions 157, each being extension 157 connected with the respective projections 154. Each linear semiconductor 151 may become larger or broaden in the vicinity of where the gate lines 121 intersect with the storage electrode lines 131, in order to cover the intersected areas of the gate lines 121 and the storage electrode lines 131.

A plurality of linear ohmic contacts 161 and island-shaped ohmic contacts 165, which are made of silicide or N+ hydrogenated amorphous silicon highly doped with N-type impurities, may be formed on the linear semiconductors 151. Each linear ohmic contact 161 includes a plurality of projections 163. A set of the projection 163 and the island-shaped ohmic contact 165 may be placed on the projection 154 of the semiconductor 151.

All lateral sides of the semiconductors 151 and the ohmic contacts 161 and 165 slope in the range from about 30° to about 80° to the surface of the substrate 110.

A plurality of data lines 171 and a plurality of drain electrodes 175 separated from the data lines 171 may be formed on the ohmic contacts 161 and 165 and the gate insulating layer 140.

The data lines 171 extend substantially in a vertical direction and cross the gate lines 121 and the storage electrode lines 131, and transmit data voltages. Each data line 171 includes an end portion 179 having a sufficiently large area to connect with another layer or an external device.

Each drain electrode 175 includes an expansion 177 that crosses or overlaps with the storage electrode 133 of the storage electrode line 131.

The vertical portion of each data line 171 includes a plurality of projections. The partial vertical portion including the two adjacent projections forms a source electrode 173, partially surrounding an edge of the drain electrode 175. A gate electrode 124, a source electrode 173, a drain electrode 175, and a projection 154 of a semiconductor 151 form a TFT. A TFT channel is formed in the projection 154 provided between the source electrode 173 and the drain electrode 175.

The data lines 171 and the drain electrodes 175 may be made of a refractory metal such as a Mo-containing metal, Cr, Ta, or Ti. The data lines 171 and the drain electrodes 175 may be configured to have the multi-layered structure including a lower layer (not shown) of one among Mo, a Mo alloy, Cr, etc., and an upper layer (not shown) of an Al-containing metal or similar material.

Similar to the gate lines 121 and the storage electrodes 131, all of the lateral sides of the data lines 171 and the drain electrodes 175 slope in the range from about 30° to about 80° with respect to the surface of the substrate 110.

The ohmic contacts 161 and 165 are interposed between the semiconductor 151 and the data line 171 and between the drain electrode 175 and the projection 154 of the semiconductor 151, in order to reduce contact resistance therebetween. The linear semiconductors 151 are partially exposed where the data lines 171 and the drain electrodes 175 do not cover them, as well as between the source electrodes 173 and the drain electrodes 175.

A passivation layer 180, which may be made of an inorganic material such as $SiN_2$, $SiO_2$, etc., is formed on the data lines 171, the drain electrodes 175, and the exposed portions of the semiconductors 151.

An organic insulating layer 187, which may be made of a photosensitive organic material having a prominent planarization property, is formed on the passivation layer 180. A top surface of the organic insulating layer 187 may be uneven.

Due to such an uneven surface, reflective electrodes 194 overlying the organic insulating layer 187 have uneven patterns. The uneven patterns of the reflective electrodes 194 maximize reflectance. The inorganic insulating layer 187 is removed from a pad portion including the end portions 125 and 179 of the gate lines 121 and the data lines 171, so that the passivation layer 180 only remains on the pad portion.

The passivation layer 180 is provided with a plurality of contact holes 183 to expose the enlarged end portions 179 of the data lines 171. A plurality of contact holes 182 are formed in the passivation layer 180 and the gate insulating layer 140 to expose the enlarged end portions 125 of the gate lines 121. A plurality of contact holes 185 are also formed in the passivation layer 180 and the inorganic insulating layer 187 to expose the expansion areas 177 of the drain electrodes 175. The contact holes 182, 183, and 185 may have various shapes such as a polygon, circle, etc., and the sidewalls of each of the contact holes 182, 183, and 185 slope in the range from about 30° to about 80° to the surface of the substrate 110 or are shaped as steps.

A plurality of pixel electrodes 190 may be formed on the inorganic insulating layer 187.

Each pixel electrode 190 includes a transparent electrode 192 and a reflective electrode 194 overlying the transparent electrode 192. The transparent electrodes 192 are made of a transparent conductive material such as ITO or IZO, and the reflective electrodes 194 are made of a reflective opaque material such as Al, an Al alloy, Ag, or an Ag alloy. Each pixel electrode 190 may further include a contact assistant (not shown) made of Mo, a Mo alloy, Cr, Ti, or Ta. The contact assistants ensure sufficient contact between the transparent electrodes 192 and the reflective electrodes 194, while preventing oxidation of the transparent electrodes 192 and the reflective electrodes 194.

Each pixel is divided into a transmissive area (TA) 195 without the reflective electrode 194 and a reflective area (RA) with the reflective electrode 194. The inorganic insulating layer 187 is removed from the transmissive area (TA) 195, and a cell gap size of the transmissive area (TA) 195 is about twice that of the reflective area (RA). Such configuration compensates the difference between light paths of the transmissive areas (TA) and the reflective areas (RA), which is caused when light passes through the LC layer 3.

The pixel electrodes 190 are physically connected with and electrically coupled with the drain electrodes 175 through the contact holes 185 to receive data voltages from the drain electrodes 175. The pixel electrodes 190 supplied with the data voltages generate electric fields in cooperation with the common electrode 270, determining the orientations of LC molecules in the LC layer 3 interposed between the two electrodes.

A set of the pixel electrode 190 and the common electrode 270 may form a capacitor capable of storing the applied voltage when the TFT is turned off. This capacitor is referred to as a "liquid crystal capacitor". To improve the voltage storage ability, another capacitor referred to as a "storage capacitor" may be further provided. The storage capacitor may be connected in parallel to the liquid crystal capacitor. The storage capacitor operates by crossing the expansion 177 of the drain electrode 175 with the storage electrode line 131. The storage capacitor may also operate by crossing the pixel electrode 190 with the gate line 121 adjacent thereto. It is understood that, the storage electrode line 131 may be omitted, as necessary.

The pixel electrodes 190 may cross the data lines 171 adjacent thereto the gate lines 121 adjacent thereto, in order to increase the aperture ratio. However, it is understood that such overlap portions do not need to be implemented to increase the aperture ratio.

The pixel electrodes 190 may be made of a transparent conductive polymer. However, in reflective LCDs, opaque reflective metals may be used.

A plurality of contact assistants 95 and 97 overlying the passivation layer 180 of the pad portion are individually connected with the end portions 125 of the gate lines 121 and the end portions 179 of the data lines 171 through the contact holes 182 and 183. The contact assistants 95 and 97 improve adhesion between the end portions 125 and 179 and exterior devices, and protect the end portions 125 and 179. However, the contact assistants may be omitted when determined not to be necessary. The contact assistants 95 and 97 may be formed on the same layer as the transparent electrodes 192 or the reflective electrodes 194.

First and second phase retardation films 13 and 14 may be formed or the reflective electrodes 194 and the exposed transparent electrodes 192 to compensate phase delay of the LC layer 3. The first and second phase retardation films 13 and 14 may be formed by hardening the LC layer 3 having the LC molecules.

The phase difference between the first and second phase retardation films 13 and 14 is represented as a quarter wave.

The main axis of the first phase retardation film 13 is formed at approximately θ±45°. In the reflective area (RA), the phase difference is maximal when the angle formed between the first phase retardation film 13 and the polarizer 22 is 45°. The first phase retardation film 13 converts a linearly polarized component into a circularly polarized component, or a circularly polarized component into a linearly polarized component by giving the phase difference of as much as a quarter wave of the two components, which are parallel to the main axis of the first phase retardation film 13 and perpendicular to one another.

The main axis of the second phase retardation film 13 is formed at approximately θ or θ±90°. In the transmissive area (TA), there is no difference between an angle of the second phase retardation film 14 and angles of the two polarizers 11 and 12; therefore, there is no phase difference. The second phase retardation film 14 may be omitted, if necessary.

Photosensitive alignment layers (not shown) may be provided between the pixel electrode 190 and the first phase retardation films 13 and/or between the pixel electrode 190 and the second phase retardation film 14. In the transmissive area (TA) and the reflective area (RA), alignment axes of the alignment layers may be directed to each other differently by exposing the alignment layers in different directions. Due to the axes of the alignment layers being differently directed, the main axes of the first phase retardation film 13 and the second phase retardation film 14 are positioned at different angles.

The common electrode panel 200 facing the TFT panel 100 may be configured according to the description below.

A shading device 220 referred to as a "black matrix" may be provided on an insulating substrate 210 made of a transparent insulating material such as glass, to prevent light leakage between the pixel electrodes 190 and to define aperture regions facing the pixel electrodes 190.

A plurality of color filters 230 are formed on the substrate 210 and the shading device 220. Most of the color filters 230; e.g., more than half, are placed within the aperture regions defined by the shading device 220. Each color filter 230 is placed between the two adjacent data lines 171 in a substantially vertical direction, exhibiting one color among red, green, blue, and white. The color filters 230 are connected with one another, having the shape of stripes.

The color filters 230 of the transmissive areas (TA) are thicker than the color filters 230 of reflection areas (RA), in order to compensate for the difference of color tones between the transmissive areas (TA) and the reflection areas (RA), which is caused by the difference of light transmittance between the two areas. Another method for compensating the different color tones is to form holes in the color filters 230 of the reflective areas (RA), while maintaining a uniform thickness of the color filters 230 in all areas.

A common electrode 270, which may be made of a transparent conductive material such as ITO or IZO, may be formed on the shading means 220 and the color filters 230.

Figure 7:
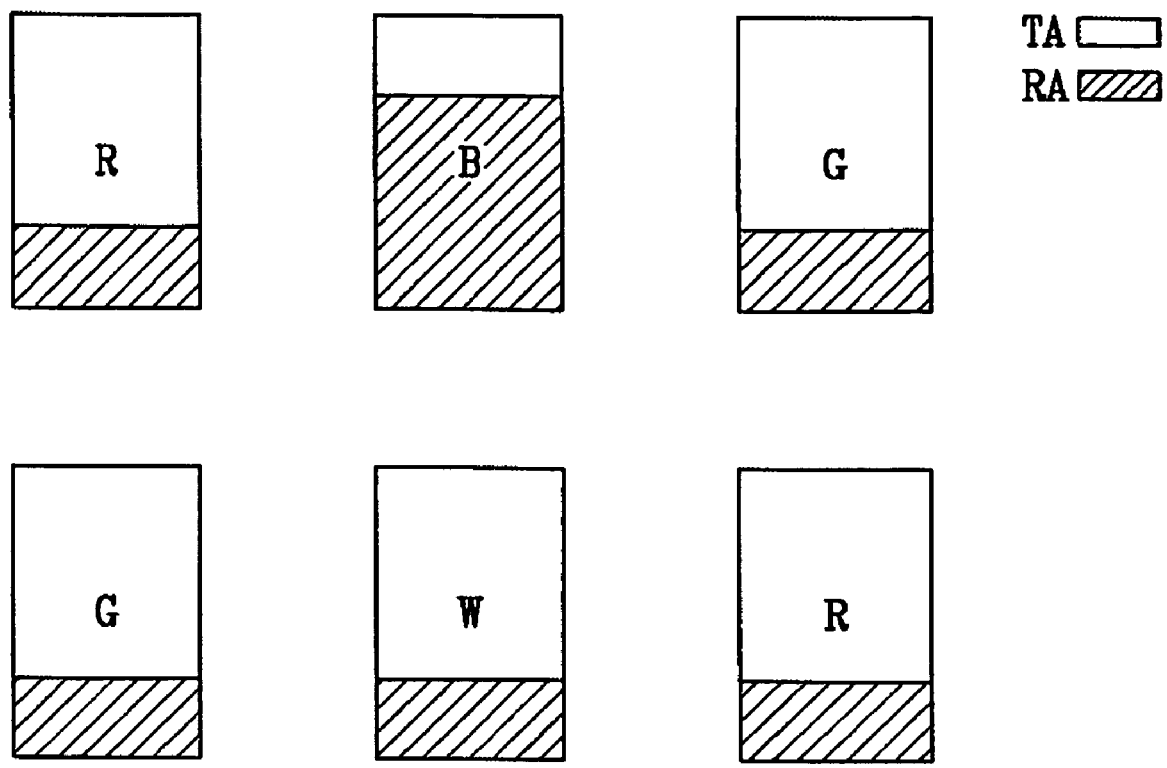
FIG. 7 is a view indicating transmissive areas (TA) and reflection areas (RA) in subpixels of an LCD according to an embodiment of the invention.
Figure 8:
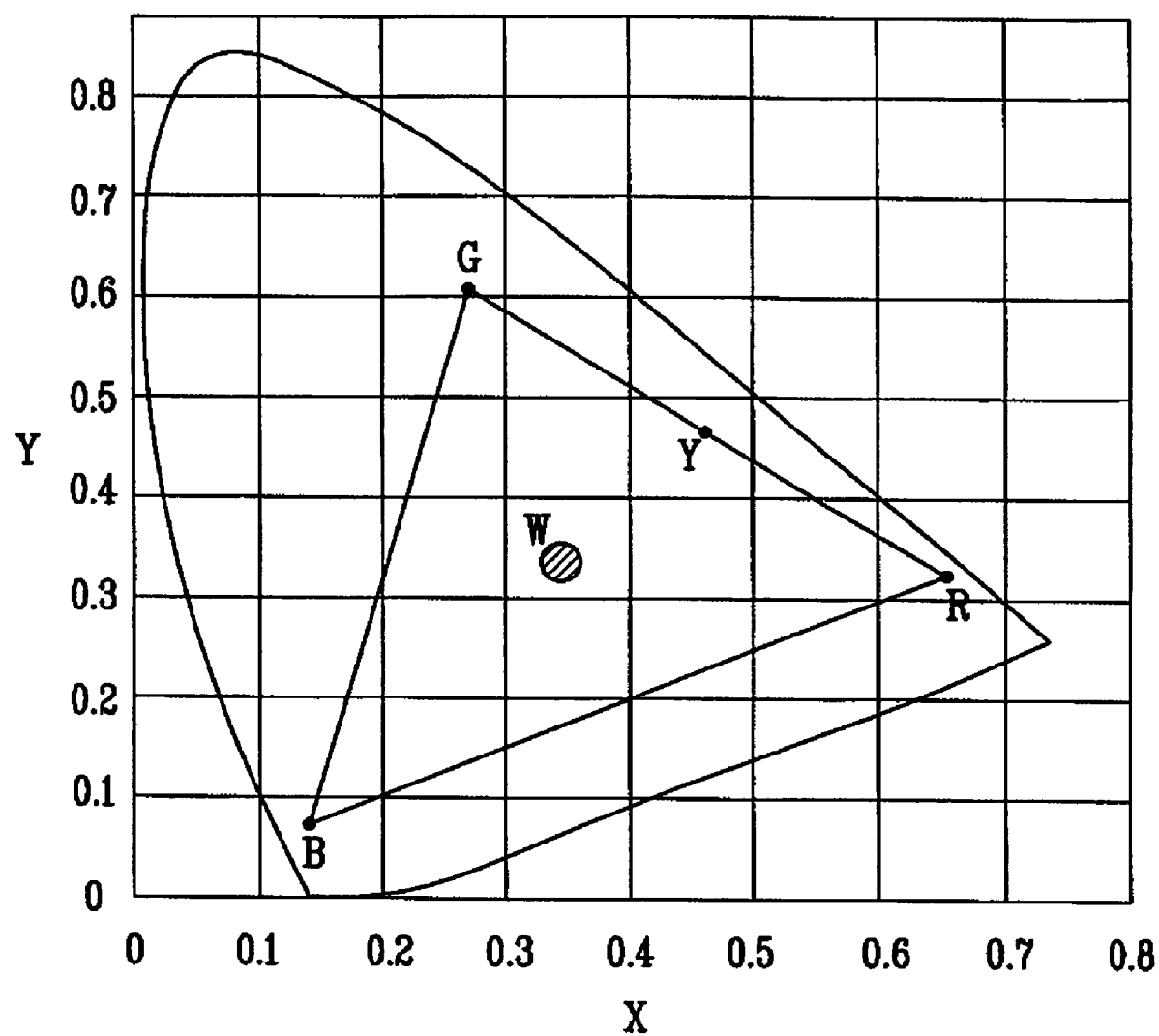
FIG. 8 is a graph showing chromaticity coordinates of an LCD according to an embodiment of the invention.

FIG. 7 is a view indicating transmissive areas (TA) and reflection areas (RA) in subpixels of an LCD according to an embodiment of the invention. FIG. 8 is a graph showing chromaticity coordinates of an LCD according to an embodiment of the invention.

As shown in FIG. 7, the red, green, and white subpixels R, G, and W, has about 2:1 ratio of the transmissive area (TA) to the reflective area (RA). On the other hand, the ratio is about 1:2 in the blue subpixel B.

Based on the above-mentioned ratios, when calculating the dimension ratio of the transmissive areas (TA), a ratio of to about 2:2:0.5:1 is obtained in order of the RGBW subpixels. The dimension ratio of the reflective areas (RA) is about 2:2:2:1 in order of the RGBW subpixels.

According to at least the above described structure, when the LCD is operated in the transmissive mode, all six of the subpixels forming a pixel, are operated. In the reflective mode, only five of the subpixels are operated. The white subpixel W does not operate. In this case, the operating subpixels exhibit light, while the subpixel that is not operating is in the black state.

The brightness of the light emitted from a subpixel in the transmissive mode is substantially proportional to the dimensions of the transmissive area (TA) assigned in the subpixel. Similarly, the brightness of light emitted from a subpixel in the reflective mode is substantially proportional to the dimensions of the reflective area (RA) assigned in the subpixel. For example, the brightness of the white subpixel W in the transmissive mode is about twice brighter than that in the reflective mode.

Accordingly, in the transmissive mode, the brightness of the light coming from the entire transmissive areas (TA) assigned in a pixel is substantially proportional to the total transmissive areas (TA) within the pixel. In the reflective mode, the brightness of the light coming from the entire reflective areas (RA) assigned in the same pixel is substantially proportional to the total reflective areas (RA) within the pixel. In this embodiment, the brightness in the transmissive mode is 5.5 cd/m$^2$ obtained by adding up the entire transmissive areas (TA) while the brightness in the reflective mode is 6 cd/m$^2$ obtained by adding up the entire reflective areas (RA). Accordingly, the brightness in the transmissive mode and the brightness in is the reflective mode may be controlled to have the same value. To accomplish this, white light in the two modes must have the same chromaticity coordinates in the graph shown in FIG. 8.

Generally, the coordinates of white are adjusted in the range from about (0.32,0.32) to about (0.32±0.01,0.32±0.01). According to FIG. 8, the coordinates of white are represented as a hatching-applied circle W.

There are different methods to vary the brightness. For example, one method is to compensate insufficient blue component in the transmissive mode by enhancing the blue component emitting from lamps of the backlight unit 900. Another method is to reduce the blue component in the reflective mode. This method may be accomplished by reducing the reflective area (RA) in the blue subpixel B. However, when the reflective area (RA) in the blue subpixel B is reduced excessively, the coordinates of white are transferred from the hatching circle W toward the right of the circle W and causes a yellowish phenomenon. To prevent the yellowish phenomenon from occurring, the adequate ratio of the transmissive areas RA should be set to approximately 2:2:1.5 or approximately 2:2:2 in the order of red, blue, and green.

As discussed above, in the blue subpixel B, the reflective area (RA) is larger than the transmissive area (TA). All six of the subpixels operate during the transmissive mode while only five subpixels, (not the white subpixel W) operate during the reflective mode. This enables the LCD screen to exhibit a uniform brightness in all modes.

In addition, to obtain the uniform brightness of the entire LCD screen and to settle the yellowish problem of the screen, the blue component may be compensated by the lamps of the backlight unit 900, and the coordinates of white are maintained as the substantially same value in the two modes by controlling the magnitude of the reflective area (RA) in the blue subpixel B.

Similarly, in the four-color LCDs adopting the rendering technology, the yellowish problem may be remedied by providing the enlarged reflective area (RA) in the blue subpixel B and by compensating the blue component in the lamps to define the coordinates of white within the allowable range.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A four-color liquid crystal display, comprising:
a plurality of pixels, each pixel comprising a set of six subpixels,
wherein each subpixel comprises a transmissive area and a reflective area, wherein the reflective area is equal to or larger than the transmissive area in a first subpixel, and wherein the transmissive area is larger than the reflective area in each of the remaining subpixels.

2. The liquid crystal display of claim 1, further comprising:
a signal controller that receives three-color image signals and converts the applied image signals into four-color image signals,
wherein the signal controller executes a rendering process for the three-color image signals.

3. The liquid crystal display of claim 2, wherein the first subpixel is the darkest subpixel of the six subpixels.

4. The liquid crystal display of claim 3, wherein the subpixels are arranged substantially in a matrix and the first subpixel is arranged along a central line of the matrix.

5. The liquid crystal display of claim 4, further comprising:
a second subpixel arranged along the same central line as the first subpixel;
a third subpixel arranged at a left side of the first subpixel and a fourth subpixel arranged at a right side of the first subpixel; and
a fifth subpixel arranged at a left side of the second subpixel and a sixth subpixel arranged at a right side of the second subpixel.

6. The liquid crystal display of claim 5, wherein the third subpixel and the sixth subpixel exhibit the same color, and wherein the fourth subpixel and the fifth subpixel exhibit the same color.

7. The liquid crystal display of claim 6, wherein the liquid crystal display operates, either in a transmissive mode or a reflective mode,
wherein all of the subpixels operate when the liquid crystal display operates in the transmissive mode, while five subpixels excluding the second subpixel operate when the liquid crystal display operates in the reflective mode.

8. The liquid crystal display of claim 7, wherein the first subpixel is a blue subpixel.

9. The liquid crystal display of claim 8, wherein the second subpixel is a white subpixel.

10. The liquid crystal display of claim 9, wherein the third subpixel and the sixth subpixel are red subpixels.

11. The liquid crystal display of claim 10, wherein the fourth subpixel and the fifth subpixel are green subpixels.

12. The liquid crystal display of claim 11, wherein when the liquid crystal display operates in the reflective mode, the ratio of the respective reflective areas in the red, green, and blue subpixels is 2:2:1.5 or 2:2:2.

13. The liquid crystal display of claim 11, wherein when the liquid crystal display operates in the transmissive mode, the ratio of the respective transmissive areas in the red, green, blue, and white subpixels is 2:2:0.5:1 or 2:2:0.75:1.

14. The liquid crystal display of claim 12, wherein chromaticity coordinates of white are positioned within the range from about (0.32, 0.32) to about (0.32±0.01, 0.32±0.01).

15. The liquid crystal display of claim 13, wherein chromaticity coordinates of white are positioned within the range from about (0.32, 0.32) to about (0.32±0.0 1, 0.32±0.01).

16. A four-color liquid crystal display, comprising:
a plurality of pixels,
wherein each pixel includes a set of six subpixels comprising a red color, a green color, a blue color, and a white color that are arranged in a 2×3 matrix, and
wherein each subpixel comprises a transmissive area and a reflective area, and a blue subpixel exhibiting blue has a reflective area that is greater than or is equal to a size of the transmissive area, while the transmissive area of each of a red, a green and a white subpixels is larger than the reflective area.

17. The liquid crystal display claim 16, further comprising:
a signal controller that receives three-color image signals and converts the applied image signals into four-color image signals,
wherein the signal controller executes a rendering process for the three-color image signals.

18. The liquid crystal display claim 17, wherein the liquid crystal display operates in either a transmissive mode or in a reflective mode,
wherein all of the six subpixels operate when the liquid crystal display operates in the transmissive mode, while five subpixels excluding the white subpixel operate when the liquid crystal display operates in the reflective mode.

19. The liquid crystal display claim 18, wherein when the liquid crystal display operates in the reflective mode, the ratio of the respective reflective areas in the red, green, and blue subpixels is 2:2:1.5 or 2:2:2.

20. The liquid crystal display claim 18, wherein when the liquid display operates in the transmissive mode, the ratio of the respective transmissive areas in the red, green, blue, and white subpixels is 2:2:0.5:1 or 2:2:0.75:1.

21. The liquid crystal display of claim 19, wherein the blue subpixel and the white subpixel are arranged in a first line.

22. The liquid crystal display of claim 20, wherein the blue subpixel and the white subpixel are arranged in a first line.

23. The liquid crystal display of claim 21, wherein a red subpixel and a green subpixel are arranged in a second line, another red subpixel and another green subpixel are arranged in a third line, and the first line is arranged approximately parallel to and approximately centered between the second line and the third line.

24. The liquid crystal display of claim 22, wherein a red subpixel and a green subpixel are arranged in a second line, another red subpixel and another green subpixel are arranged in a third line, and the first line is arranged approximately parallel to and approximately centered between the second line and the third line.

25. The liquid crystal display of claim 23, wherein the red subpixel of the second line is arranged diagonal to the red subpixel of the third line, and wherein the green subpixel of the second line is arranged diagonal to the green subpixel of the third line.

26. The liquid crystal display of claim 24, wherein the red subpixel of the second line is arranged diagonal to the red subpixel of the third line, and wherein the green subpixel of the second line is arranged diagonal to the green subpixel of the third line.

27. The liquid crystal display of claim 25, wherein chromaticity coordinates of white are positioned within the range from about (0.32, 0.32) to about (0.32±0.01, 0.32±0.01).

28. The liquid crystal display of claim 26, wherein chromaticity coordinates of white are positioned within the range from about (0.32, 0.32) to about (0.32±0.01, 0.32±0.01).

* * * * *